United States Patent [19]

Shoji et al.

[11] Patent Number: 5,199,995

[45] Date of Patent: Apr. 6, 1993

[54] COMPOUNDS FOR REMOVING IRON RUST SCALES FROM WATER PIPES AND METHOD THEREFOR

[75] Inventors: Masami Shoji, Sendai; Kishio Shoji, Tokyo, both of Japan

[73] Assignee: Seisui Co., Ltd., Japan

[21] Appl. No.: 867,645

[22] Filed: Apr. 13, 1992

Related U.S. Application Data

[63] Continuation-in-part of Ser. No. 682,315, Apr. 9, 1991, abandoned.

[51] Int. Cl.$^5$ ............................ C02F 5/08; C23G 1/08
[52] U.S. Cl. ..................................... 134/2; 134/22.13; 134/22.14; 134/22.16; 134/22.17; 252/80
[58] Field of Search ............... 134/2, 3, 22.13, 22.14, 134/22.16, 22.17, 41, 42; 252/80; 210/660, 767

[56] References Cited

U.S. PATENT DOCUMENTS

| | | | |
|---|---|---|---|
| 2,631,950 | 3/1953 | Rosenfeld et al. | 134/3 |
| 4,108,680 | 8/1978 | Barr, Jr. | 134/3 |
| 4,610,728 | 9/1986 | Natesh et al. | 134/2 |
| 4,810,405 | 3/1989 | Waller et al. | 134/2 X |
| 4,824,589 | 4/1989 | Magyar et al. | 252/82 |
| 4,828,743 | 5/1989 | Rahfield et al. | 252/87 |
| 5,015,298 | 5/1991 | Arrington | 134/3 |
| 5,022,926 | 6/1991 | Kreh et al. | 134/2 |

Primary Examiner—Theodore Morry
Assistant Examiner—Saeed Chaudhry
Attorney, Agent, or Firm—Shlesinger Arkwright & Garvey

[57] ABSTRACT

A method for the removal of rust deposits from the interior walls of fluid conduits comprising the steps of preparing a shaped compound consisting of iron oxides and manganese oxides as primary elements, at least one oxide of Cu, Ni, Cr, Zn, Co, Mg, Ti, V, Sn, Ba, Y and Gd as secondary elements and at least one silica oxide, silicate salt, aluminum oxide and aluminum salt as a binding element. When chlorine containing water is contacted with the compounds, the water is activated to dissolve iron rust scales which have adhered to the interior of the pipe walls thereby facilitating removal while providing a protective coating onto the pipe walls.

3 Claims, 1 Drawing Sheet

COMPOUNDS FOR REMOVING IRON RUST SCALES FROM WATER PIPES AND METHOD THEREFOR

This application is a continuation-in-part of application Ser. No.: 07/683,315 filed Apr. 9, 1991, now abandoned.

FIELD OF THE INVENTION

The present invention relates to a process for dissolving and removing iron scale and rust deposits from water pipes or the like by chemically treating the water therein.

BACKGROUND OF THE INVENTION

Removal of iron scale deposits from water sources is a problem for residential households, apartment complexes and commercial office buildings. In heavily urban areas, this problem is often magnified due to the age of the buildings and the inaccessibility to the water pipes for routine maintenance.

Conventionally, drinking water for city buildings may be supplied to each floor from a tank installed on the buildings roof. The water is pumped up from underground storage tanks to a rooftop tank. Over a period of time, iron rust scale and deposits accumulate within the pipes as they pipes age and deteriorate. Dissolved minerals within the water also contribute to scaling and the accumulation of deposits. Further, during warm weather months the pipes may be subject to algae blooms within the water. Even if water for a building is supplied from municipal sources rather than a storage tank, the age of the existing pipes may contribute to scale deposits within the water supplied to the consumer. All of these factors combine to reduce the quality and potability of the water.

Prior art attempts at remedying the problem of scale deposits have historically focused upon the development of methods for chemically treating the water within the pipes. However such attempts have often been met with limited success.

U.S. Pat. No. 4,610,728 (Natesh et al.) discloses a process for dissolving deposits of magnetite from a metal surface by contacting the surface with an aqueous solution of an alkali metal borohydride and an iron chelating agent. U.S. Pat. No. 4,828,743 (Rahfield et al.) discloses a method for removing rust stains from a solid surface by applying oxalic acid based upon the total composition of ferrous iron and mineral acids. The process also includes a rinsing step. U.S. Pat. No. 4,108,680 (Barr, Jr.) discloses a process for the removal of calcium oxalate scale from a metal surface by contacting the scale with an aqueous suspension of nitric acid and manganese dioxide. Finally, U.S. Pat. No. 2,631,950 (Rosenfeld et al.) discloses a method and composition for removing rust and scale from engine cooling systems by supplying a solution containing an oxalic acid and a hydrolyzable chloride of a trivalent metal. The solution is then contacted with the surface of the metal at elevated temperatures.

All of the above noted prior art rust removal methods suffer from a general disadvantage in that they are all inherently short term solutions. Further, they require a variety of steps and chemicals which must be applied sequentially. Very often these numerous chemicals inhibit the chlorine-based disinfecting chemicals which are already in the water. In addition, all of the prior art scale removal methods are either expensive and/or time consuming in application.

Because of the contamination risk from bacteria and water born algae, water sources within urban areas are often treated with chemicals to "activate" the water thereby reducing the risk of contamination as well as undesirable odors and coloration. Conventionally speaking, city water will contain between 0.1 to 2.1 mg/l of chlorine as a disinfectant. Once chlorine contacts the water it generates both hypochlorous acid and hydrochloric acid as indicated in reaction (I) given below:

$$Cl_2 + H_2O \rightarrow HCl + HClO \qquad (I)$$ 

Although the above reaction occurs rapidly, it does not easily proceed to completion and generally reaches an equilibrium after generating about 50% of the hypochlorous acid at a pH value between about 7 and 8. This inability to generate hypochlorous acid to completion is often due to the high solubility of chlorine. At 25° C., chlorine has a solubility of 0.67 g/100 cc. The hypochloric acid produced in the chlorination reaction of water given in reaction (I) also serves to generate additional disinfecting compounds such as dichlorine oxide and chlorine dioxide and as indicated in reaction (II) and (III) give below:

$$2\ HClO \ominus Cl_2O + H_2O \qquad (II)$$ 

$$4\ HClO + Cl_2 \leftarrow 4\ HCl + 2\ ClO_2 \qquad (III)$$ 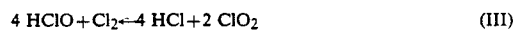

All three reactions serve to disinfect and deodorize water within a particular water source and collectively activate the water.

Prior art rust and scale removal processes often inhibit or deteriorate the disinfecting characteristics of activated water. Further, the prior art iron scale removal processes are not suitable for treatment with plumbing associated with drinking water since a number of the prior art chemicals are potentially toxic at elevated levels. Hence, prior art scale removal processes fail to provide a practical means for removing rust buildup and maintaining a rust-free environment within the pipes once treatment has occurred.

OBJECTS AND SUMMARY OF THE INVENTION

The present invention relates to a method for removing iron rust scales generated in water pipes or the like comprising the steps of preparing a compound consisting of iron oxide and manganese oxides as primary constituents and at least one oxide of Cu, Ni, Cr, Zn, Co, Mg, Ti, V, Sn, Ba, Y and Gd as secondary constituents and at least one silica oxide, silicate salt, aluminum oxide and aluminum salt as a binding agent. When chlorine containing water is contacted with the above compound, the water is activated to make the iron rust scales within the interior of the pipe water-soluble thereby allowing removal of the scales from the water pipes.

It is therefor an object of the present invention to provide a method for removing accumulated iron rust scales within water pipes which serves to accelerate and improve the hydration reaction of the conventional chlorine disinfectant within the water.

A further object of the present invention is to provide a method for removing iron rust scale deposits within water pipes which employs a composition that can be shaped into a variety of configurations for positioning for contact with the water source thereby providing long-term iron scale removal.

It is yet a further object of the present invention to provide a composition for use in a method for removing iron rust scales from the interior of water pipes which can be mass produced at a low cost using conventional molding and sintering techniques.

A still further object of the present invention is to promote long term rust scale inhibition by providing a method which coats a protective layer of ferrous ferric oxide onto the interior of the pipe.

A still further object of the present invention is to provide a method for the removal of iron scale from the interior of water pipes and additionally provide a deodorant effect and increased oxygenation effect due to the increased iron ion content of the water which makes the water weakly basic.

Another object of the present invention is to provide a method of scale removal which is economical and provides long term protection for the pipes and the entire water system.

A further object of the present invention is to provide a method for the removal of rust scale which utilizes a composition formable into a variety of shapes such as pellets, boards, cylinders and fibers thereby expanding the range of utility for the method.

Yet another object of the present invention is to provide a method for the removal of rust scale from the interior of water pipes and which is applicable for residential, industrial, business and office buildings as well as large scale apartment buildings use.

A further object of the present invention is to provide a method for the removal of rust scale from the interior of water pipes which eliminates the need for large scale repair work to the water pipe system.

The manner in which these as well as other objects of the present invention can be accomplished will be apparent from the following detailed description and examples.

DETAILED DESCRIPTION OF THE PREFERRED EMBODIMENT

Figure 1:
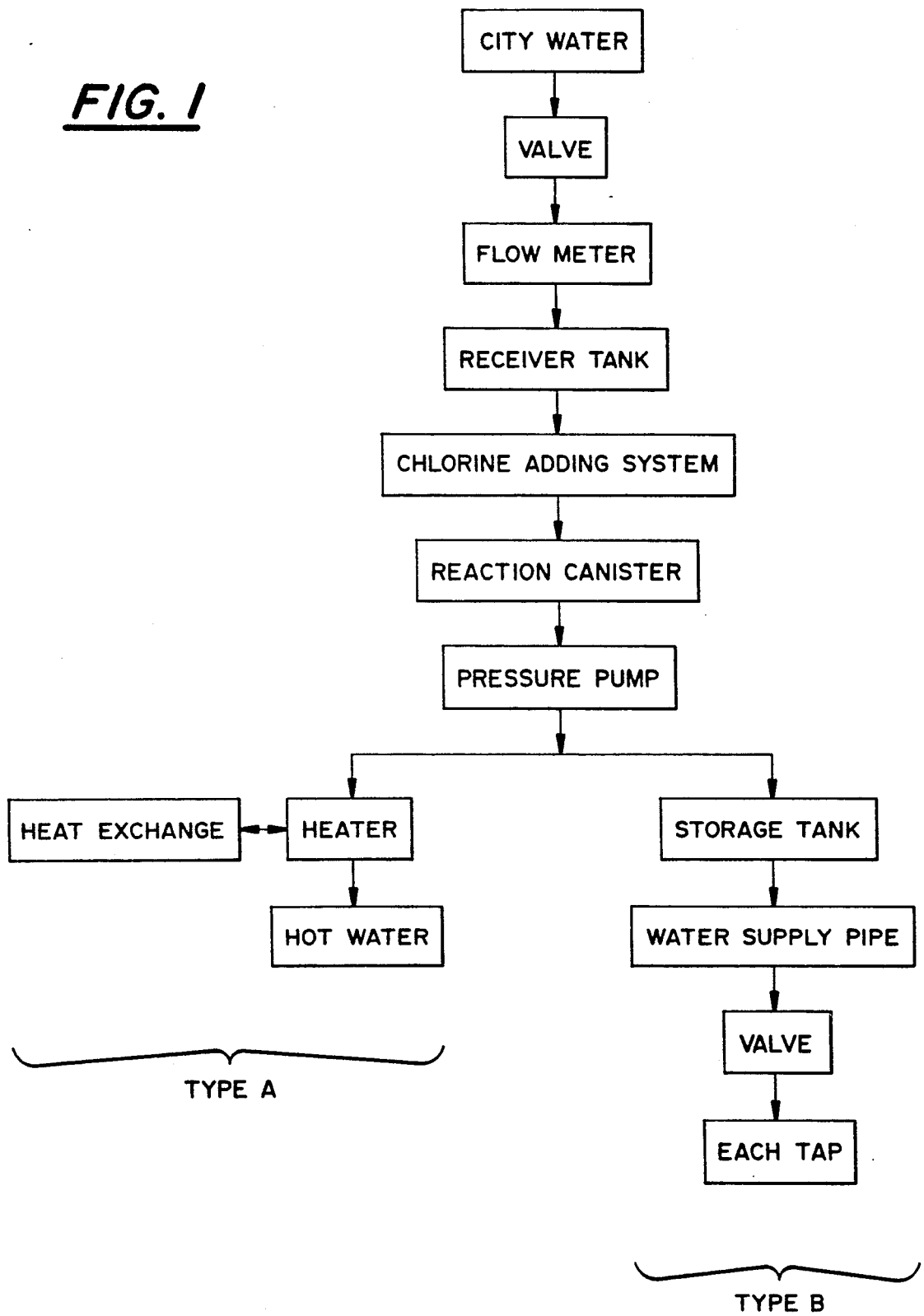
FIG. 1 illustrates a flow chart identifying the sequence of water treating steps according to the present invention and as set forth in a first method (type A) and discussed with reference to example 1 and a second method (type B) discussed with reference to example 2.

The preferred metal rust removal compound for use with the method of the present invention comprises three basic components consisting of (1) primary component which make up the bulk of the composition, (2) secondary component and lastly (3) a binder component to aid in the formation of the composition into a unitary mass.

The secondary component according to the present invention comprise between about 2% to 15% of the total weight of an oxide of Cu, Ni, Cr, Zn, Co, Mg, Ti, V, Sn, Ba, Y and Gd. A preferred composition provides a metal oxide comprising 4% of the total weight of the composition.

The binder component comprises between 10% to 70% of the total weight of the composition and in a preferred composition comprises 40% by weight of the total composition. The binder component comprises silica oxide, silicate salts, aluminum oxides, aluminum salts and mixtures thereof.

The balance of the composition is made up of the primary component iron oxides and manganese oxides. In a preferred composition the iron oxides comprise between about 55% to about 90% by weight of the balance and the manganese oxides comprise between 4% to about 30% by weight of the balance of the composition.

In a preferred embodiment according to the present invention, the constituents of the composition comprise a mixture of the oxides of Co, Ba, Ti and Y having 4.0 weight % in total which mixture is admixed with silica and silica salts having 40.0 weight % in total as a binding component per 100 weight % of the composition. The balance of the composition will contain a primary component of which Fe oxide comprises 74.0 weight % and Mn oxide comprises 22.0 weight %.

The iron rust removing compounds used in the present process may be made by any of a variety of processes available and known in the art. In a preferred embodiment, the binder component and the primary component comprising the iron oxides and manganese oxides are intermixed, kneaded, shaped and dried followed by sintering at between about 1200°–1600° C. to obtain a desired hardened shape. The metal oxide secondary component may then be deposited over the pellets by conventional evaporation techniques to yield the finished product. In an alternative embodiment all of the ingredients are mixed simultaneously prior to the shaping and sintering.

The rust removal compounds according to the present inventions are generally identified as ceramics and as such may be formed into a variety of shapes dependent upon their particular utility. A compositions shape may be modified in view of a particular use or purpose for which it is being applied. These shapes may range from pellets, to flat boards, cylinder or fibers. The surface area of contact may be increased by providing a variety of pellets in different sizes and loading them into a reaction canister or other container through which water may flow. The container may then be positioned within an intake conduit which leads into the water supply source of interest. For example, the rust removal composition may be formed into a pellet shape and loaded into a reaction canister made up of a metal which is acid-resistant and pressure-resistant. The canister is then positioned within the input and output conduit lines to a water supply source. The canister must be so designed as to minimize interference with water flow while also allowing the greatest area of contact between the water and the rust removal composition.

Since the water already contains chlorine, once it contacts the rust removal compound according to the present invention, the reaction as set forth in equation (I) proceeds to the right at a greater rate to yield hydrochloric acid. Consequently, the hydrochloric acid that is produced further reacts with iron hydroxide, the main component of rust scale thereby making it a water soluble salt. Additionally, the inner surfaces of the pipe is now provided with a protective coating of ferrous/ferric oxide to inhibit further rust generation.

The invention is further illustrated, but not limited to the following examples:

EXAMPLE 1

Turning now to FIG. 1 and in particular the method as set forth by type A, a rust removal composition was formed by providing a mixture containing 74% by weight in balance of iron oxide and 22% by weight in balance of manganese oxide as the primary element. To that mixture 4 weight % in total of Co, Ba, Ti and Y oxides were added as secondary elements. A binder element of silica and silicate salts comprising 40 weight % in total were finally added to the mixture followed by kneading, shaping and drying of the mixture into uniform 10 mm pellets. The pellets were then sintered at 1300 Celsius to obtain a hardened rust removal compound which was loaded into a cylindrical reaction canister designed to fit within the inlet conduit upstream to a clogged water heater. The canister was loaded with 100 kilograms of the prepared pellets compositions. The loaded reaction canister was then installed upstream from the pressure pump which directed water through the canister and into the hot water heater which had been severely clogged with rust deposits. The water supply which had been first treated by the municipal authorities to contain chlorine ($Cl_2 = 1.5$ Mg/l) was directed into the reaction canister containing the rust removal composition as set forth above. This activated water was then pressurized by the pump and supplied to the intake side of the clogged water heater.

One month after installation, the inside of the pipe downstream of the reaction canister was removed for examination. The interior of the pipe was completely free from iron rust deposits. Further, after this period no additional iron rust scale was observed either in the intake pipe or within the interior of the water heater.

As further evidence of the cleaning effect of the present method, the fuel consumption of the hot water heater was measured before treatment according to the present invention and ten months later. The results are set forth in Table I below:

TABLE I

Before using compounds of the present invention: 2.06 Kl/day
Two months later: 1.70 Kl/day
Four months later: 1.42 Kl/day
Eight months later: 1.20 Kl/day
Ten months later: 1.80 Kl/day

EXAMPLE 2

An entire multi-level building (ten floors above ground and four floors beneath the ground) was selected as a test site since documented iron rust buildup had caused water pressure to decrease to the point where it was difficult to supply water to the bottom floors. A number of rust removal pellets were produced by sintering 50% by weight in total of aluminum oxide and aluminum oxide salts as binding agents and a balance weight % of iron and manganese oxide. After sintering, the hardened pellets were then coated with a secondary element comprising 7.0 by weight % in total of nickel oxide and 1.5 by weight % in total of Co oxide by conventional evaporation techniques. The pellets each had a size of approximately 10 mm in diameter. 400 kilograms of the pellets were then loaded within a reaction canister. As best shown under type B given in FIG. 1, the canister was installed downstream of the receiver tank and upstream of a pressure pump which led into a water storage tank and water supply pipe. The canister itself was installed on the intake side of the water supply system so as to contact all of the water which enters the storage tank. Within two weeks after installation the water pressure at the output valve downstream of the storage tank had recovered to an optimal 1.2 Kg/cm2.

After four months the main section of the primary water supply pipe was removed and examined. The red rust deposits on the interior of the pipe were completely gone, and with almost no regeneration of iron rust scale within the interior of the water intake pipe.

Applicants have found that the rust removal compositions according to the present invention lasts an exceptionally long time as evidenced by examples 1 and 2. The present invention finds utility not only within a building water supply system but also with industrial water supply systems as well as a drinking water supply systems.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

What is claimed is;

1. A method of removing iron rust scales generated in water pipes containing chlorine treated water comprising the steps of:
    a) preparing a compound comprising,
        i. a metal oxide component consisting of Co, Ba, Ti and Y comprising about 4.0% by weight based on the total compound,
        ii. a binding component selected from the group consisting of silica oxides, silicate salts, aluminum oxides, aluminum salts and mixtures thereof comprising about 10.0%–70.0% by weight based on the total compound, and
        iii. a primary component comprising the balance of the component and consisting of iron oxide and manganese oxide where the iron oxide comprises about 55.0%–90.0% by weight of the balance and the manganese oxide comprises about 4.0%–30.0% by weight of the balance;
    b) shaping the compound into a desired configuration;
    c) contacting the chlorine treated water with the shaped compound for a period of time sufficient to generate increased amount of HCl and HClO in the water; and
    d) applying the contacted, chlorine treated water to the rust scales in the water pipes thereby making the iron rust scales water soluble and permitting removal of the iron rust scales therefrom.

2. The method of claim 1, further comprising, steps of:
    a. adding chlorine to the chlorine treated water while contacting with the compound.

3. The method of claim 1 and further comprising the steps of:
    a) preparing and shaping the compound without the metal oxide component;
    b) drying the prepared and shaped compound without a metal oxide component;
    c) sintering the dried compound without a metal oxide component at a temperature between about 1200° C.–1600° C.; and
    d) depositing the metal oxide component onto the sintered compound without the metal oxide component.

* * * * *